United States Patent
Takahashi et al.

(10) Patent No.: US 9,755,491 B2
(45) Date of Patent: Sep. 5, 2017

(54) ACTUATOR AND ELECTRICAL APPLIANCE HAVING FIXED MEMBER WITH A COIL AND MOVABLE MEMBERS HAVING MAGNETS

(71) Applicants: Yuki Takahashi, Tokyo (JP); Shigenori Inamoto, Tokyo (JP); Yasutaka Kitamura, Tokyo (JP)

(72) Inventors: Yuki Takahashi, Tokyo (JP); Shigenori Inamoto, Tokyo (JP); Yasutaka Kitamura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 875 days.

(21) Appl. No.: 13/752,648

(22) Filed: Jan. 29, 2013

(65) Prior Publication Data

US 2013/0193780 A1   Aug. 1, 2013

(30) Foreign Application Priority Data

Jan. 30, 2012   (JP) ................................ 2012-016430

(51) Int. Cl.
*H02K 33/16* (2006.01)
*H02K 5/04* (2006.01)
(Continued)

(52) U.S. Cl.
CPC .............. *H02K 33/16* (2013.01); *B06B 1/045* (2013.01); *H02K 5/04* (2013.01); *H02K 5/24* (2013.01); *H02K 33/00* (2013.01)

(58) Field of Classification Search
CPC . B06B 1/045; H02K 5/04; H02K 5/24; H02K 33/00; H02K 33/16; H02K 35/00
(Continued)

(56) References Cited

U.S. PATENT DOCUMENTS 3,103,603 A * 9/1963 Reutter .................. H02K 26/00
310/15
3,453,573 A * 7/1969 Kyle ...................... G01H 11/02
310/15
(Continued)

FOREIGN PATENT DOCUMENTS

JP   06-77483 U     10/1994
JP   2000-500370 A   1/2000
(Continued)

*Primary Examiner* — Joshua Benitez-Rosario
*Assistant Examiner* — Rashad Johnson
(74) *Attorney, Agent, or Firm* — Brundidge & Stanger, P.C.

(57) ABSTRACT

An actuator includes a fixed section that includes a spindle and a coil fixed to the spindle, a first movable section that includes a first magnet magnetized in an inside-outside direction and disposed to cover the outer peripheral surface of one end in an axial direction of the fixed section, that is mounted on the spindle in an elastically-maintained state, and that is movable in the axial direction, and a second movable section that includes a second magnet magnetized in the inside-outside direction and disposed to cover the outer peripheral surface of the other end in the axial direction of the fixed section, that is mounted on the spindle in an elastically-maintained state, and that is movable in the axial direction. When current flows in the coil, the first movable section and the second movable section move in the opposite directions.

10 Claims, 11 Drawing Sheets

(51) Int. Cl.
 *H02K 33/00* (2006.01)
 *H02K 5/24* (2006.01)
 *B06B 1/04* (2006.01)

(58) Field of Classification Search
 USPC ...... 310/15, 25, 28, 51, 81, 91; 335/185, 19, 335/193
 See application file for complete search history.

(56) References Cited

U.S. PATENT DOCUMENTS

| | | | | |
|---|---|---|---|---|
| 3,553,726 | A * | 1/1971 | Zimmerman | H02K 35/02 310/15 |
| 4,235,153 | A * | 11/1980 | Rinde | F01B 25/26 310/14 |
| 4,253,493 | A * | 3/1981 | English | F01L 9/04 137/625.18 |
| 4,751,487 | A * | 6/1988 | Green, Jr. | H01F 7/1615 335/230 |
| 5,779,455 | A * | 7/1998 | Steiger | F04B 35/045 267/161 |
| 6,028,499 | A * | 2/2000 | Oudet | H01F 7/1615 335/220 |
| 6,151,780 | A | 11/2000 | Klein | |
| 6,326,706 | B1 * | 12/2001 | Zhang | F04B 35/045 310/12.24 |
| 7,540,164 | B2 * | 6/2009 | Roche | A47F 3/0443 62/246 |
| 7,586,220 | B2 * | 9/2009 | Roberts | H02K 35/02 290/1 R |
| 7,614,856 | B2 * | 11/2009 | Inagaki | F04B 35/045 267/136 |
| 8,188,623 | B2 * | 5/2012 | Park | H02K 33/16 310/12.01 |
| 2002/0195884 | A1 * | 12/2002 | Ichii | A61C 17/34 310/15 |
| 2003/0127918 | A1 * | 7/2003 | Fukunaga | H02K 33/16 310/36 |
| 2008/0278033 | A1 * | 11/2008 | Adachi | H01L 41/083 310/317 |
| 2008/0278035 | A1 * | 11/2008 | Higashionji | H02N 2/026 310/330 |
| 2009/0021114 | A1 * | 1/2009 | Adachi | H01L 41/083 310/323.16 |
| 2010/0237720 | A1 * | 9/2010 | Taylor | A61C 17/20 310/38 |

FOREIGN PATENT DOCUMENTS

| | | |
|---|---|---|
| JP | 2000-205680 A | 7/2000 |
| JP | 2002-199689 A | 7/2002 |
| JP | 3427468 B2 | 5/2003 |
| JP | 3475949 B2 | 9/2003 |
| JP | 2006-280156 A | 10/2006 |
| JP | 4123232 B2 | 5/2008 |
| WO | 2004/020161 A1 | 3/2004 |

* cited by examiner

ACTUATOR AND ELECTRICAL APPLIANCE HAVING FIXED MEMBER WITH A COIL AND MOVABLE MEMBERS HAVING MAGNETS

CROSS REFERENCE TO RELATED APPLICATIONS

This application is entitled to and claims the benefit of Japanese Patent Application No. 2012-016430, filed on Jan. 30, 2012, the disclosure of which including the specification, drawings and abstract is incorporated herein by reference in its entirety.

BACKGROUND OF THE INVENTION

1. Field of the Invention

The claimed invention relates to an actuator and an electrical beauty appliance.

2. Description of Related Art

Conventionally, electrical beauty appliances such as electric razors, electric clippers, and electric toothbrushes are known (for example, see Japanese Patent No. 4123232). In such electrical beauty appliances, a movable member (an inner cutting edge or an outer cutting edge in case of an electric razor) reciprocates, whereby grooming behaviors such as haircut or shaving are carried out. In general, an electrical beauty appliance is used in hand, but large vibration or noise gives a feeling of discomfort to a user and the electrical beauty appliance is clumsy to use. Therefore, as countermeasures against vibration in such electrical beauty appliances, various techniques have been proposed (for example, see Japanese Patent No. 3475949, Japanese Patent No. 3427468 and Japanese Translation of PCT Application Laid-Open No. 2000-500370).

Specifically, Japanese Patent No. 3475949 discloses a linear oscillator in which an amplitude control weight is connected to a movable section and which employs a so-called dynamic vibration absorber causing them to reciprocate at a resonance frequency.

Japanese Patent No. 3427468 discloses a reciprocating electric razor in which two movable sections (a central movable element and a side movable element) are arranged to be parallel to each other and are driven so that moving directions thereof are opposite to each other.

Japanese Translation of PCT Application Laid-Open No. 2000-500370 discloses an electric razor in which a motor driving force is converted into a linear motion using a power transducer mechanism and two inner cutting edges are driven in the opposite directions on the same axis (guide member).

SUMMARY OF THE INVENTION

However, when the technique disclosed in Japanese Patent No. 3475949 is used, a space for arranging the dynamic vibration absorber is necessary and it is thus difficult to achieve downsizing.

When the technique disclosed in Japanese Patent No. 3427468 is used, the moving directions of two movable sections are not set on the same axis. Accordingly, when the centroid positions thereof are unbalanced, the vibration directions are offset and it is thus difficult to completely suppress the vibration.

When the technique disclosed in Japanese Translation of PCT Application Laid-Open No. 2000-500370 is used, a space for arranging the power transducer mechanism is necessary and it is thus difficult to achieve downsizing. Since it is driven using a motor, the driving speed is restricted and it is difficult to drive the electric razor at a high speed.

An object of the claimed invention is to provide an actuator and an electrical beauty appliance in which it is possible to prevent vibration from being transmitted to a user due to reciprocation of a movable section and which can achieve downsizing.

According to an aspect of the claimed invention, there is provided an actuator including: a fixed section that includes a spindle and a coil fixed to the spindle; a first movable section that includes a first magnet magnetized in an inside-outside direction and disposed to cover the outer peripheral surface of one end in an axial direction of the fixed section, that is mounted on the spindle in an elastically-maintained state, and that is movable in the axial direction; and a second movable section that includes a second magnet magnetized in the inside-outside direction and disposed to cover the outer peripheral surface of the other end in the axial direction of the fixed section, that is mounted on the spindle in an elastically-maintained state, and that is movable in the axial direction, in which, when current flows in the coil, the first movable section and the second movable section move in the opposite directions.

According to another aspect of the claimed invention, there is provided an electrical beauty appliance including the actuator.

According to the claimed invention, since the first movable section and the second movable section reciprocate in the opposite directions to cancel vibration, it is possible to effectively prevent vibration from being transmitted to a user. Since it is not necessary to provide a dynamic vibration absorber or a power transducer mechanism, it is possible to achieve space saving and downsizing.

DESCRIPTION OF THE PREFERRED EMBODIMENTS

Now, embodiments of the claimed invention will be described in detail with reference to the accompanying drawings.

(Embodiment 1)

Figure 1:
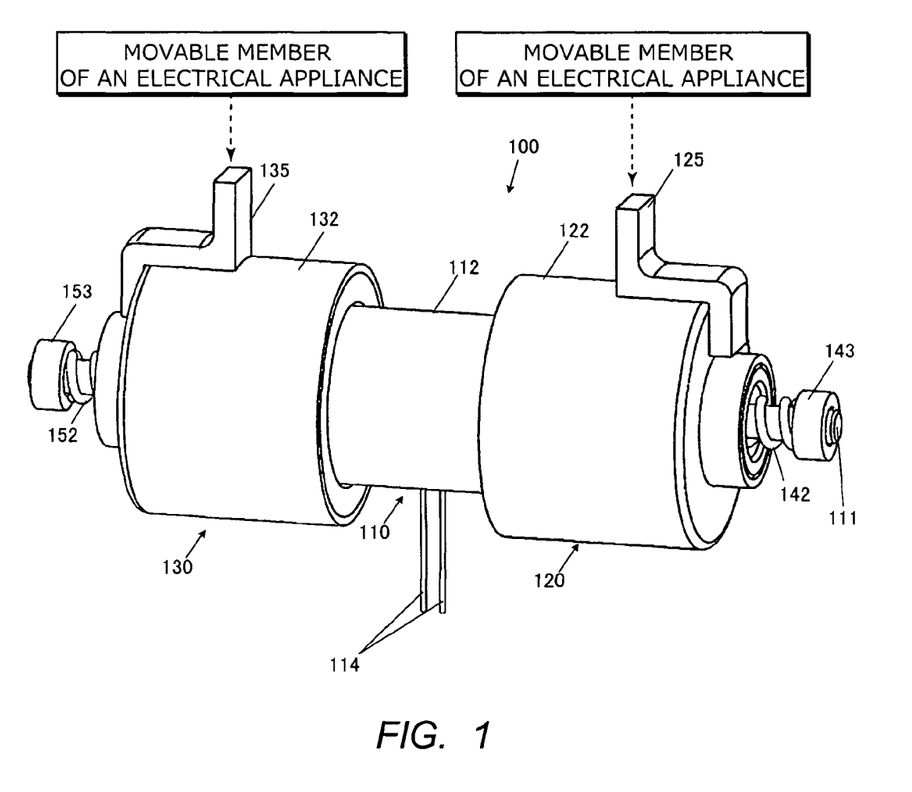
FIG. 1 is an exterior perspective view of an actuator according to Embodiment 1 of the claimed invention.
Figure 2:
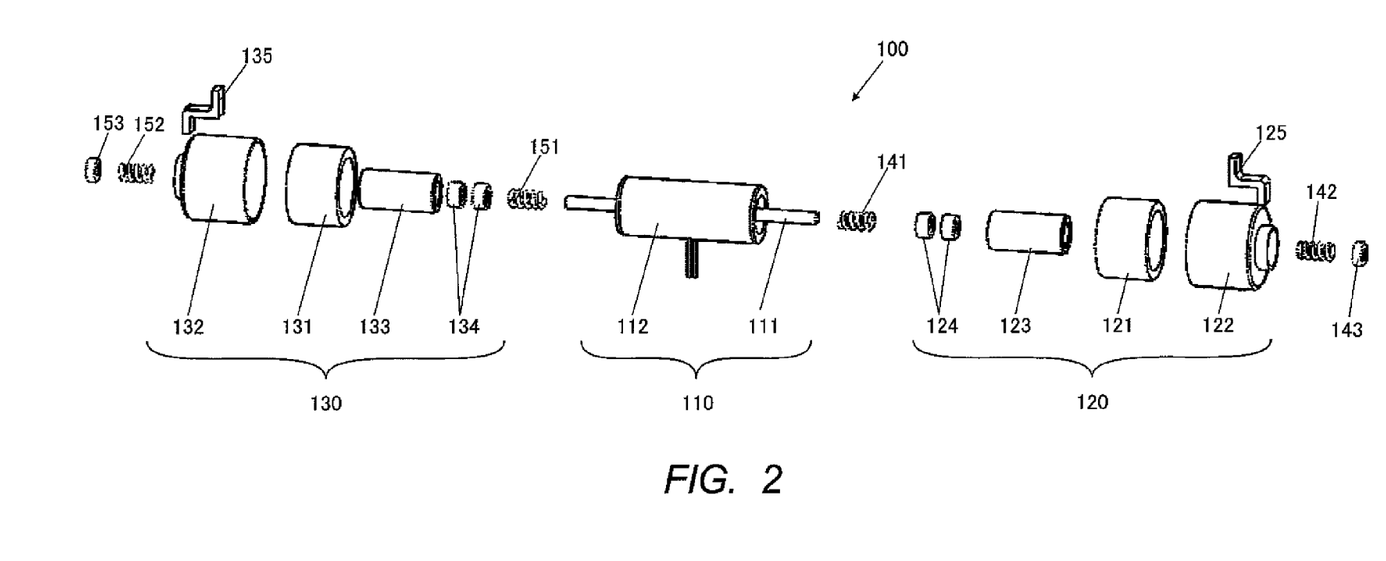
FIG. 2 is an exploded perspective view of the actuator according to Embodiment 1.
Figure 3:
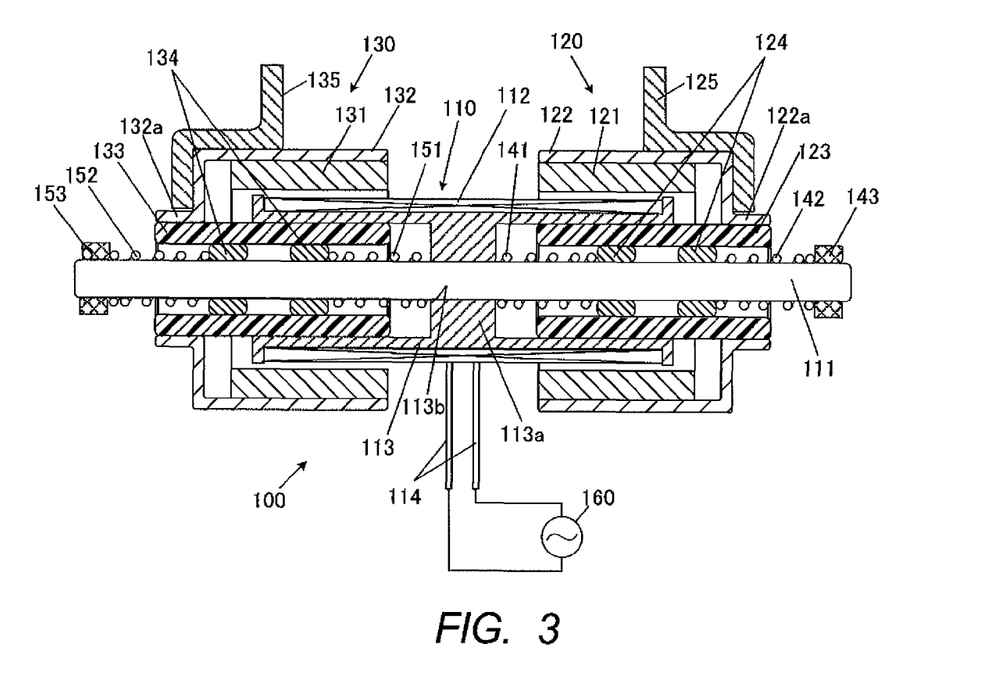
FIG. 3 is a longitudinal cross-sectional view taken along an axial direction of the actuator according to Embodiment 1.

FIG. 1 is an exterior perspective view of actuator 100 according to Embodiment 1. FIG. 2 is an exploded perspective view of actuator 100. FIG. 3 is a longitudinal cross-sectional view taken along an axial direction of actuator 100. Actuator 100 is applied to an electrical beauty appliance such as an electric razor.

As shown in FIGS. 1 to 3, actuator 100 includes fixed section 110, first movable section 120, and second movable section 130. First movable section 120 and second movable section 130 are arranged coaxially with fixed section 110 and reciprocate in the axial direction.

Fixed section 110 includes spindle 111, coil 112, and bobbin 113.

Bobbin 113 is a tubular (cylindrical in the drawings) member formed of an insulating material and has partition wall 113a formed at the center in the axial direction of a hollow portion thereof. Penetration hole 113b is formed in partition wall 113a, and spindle 111 is inserted through and fixed to penetration hole 113b. Coil 112 is wound on the outer peripheral surface of bobbin 113 in the same direction over the entire length thereof. Lead portions 114 drawn out from coil 112 are connected to AC power source 160.

First movable section 120 includes first magnet 121, first outer yoke 122, first inner yoke 123, and first bearings 124.

First magnet 121 is a tubular (cylindrical in the drawings) permanent magnet and is magnetized in an inside-outside direction. The inside-outside direction means a direction directed from the inner surface to the outer surface of the tubular magnet and is a radial direction (radiating direction from the center) in a cylindrical magnet.

Here, it is assumed that the inner peripheral side of first magnet 121 is magnetized to the south pole and the outer peripheral side thereof is magnetized to the north pole. It is preferable that first magnet 121 is an anisotropic magnet providing a magnetic force stronger than that of an isotropic magnet.

First outer yoke 122 is a tubular (cylindrical in the drawings) member formed of a magnetic material and is disposed on the outer peripheral surface of first magnet 121. First magnet 121 is fixed to the inner peripheral surface of first outer yoke 122, for example, by adhesion. Protruding portion 122a to which first inner yoke 123 is fixed is formed at one end of first outer yoke 122.

Output connection portion 125 for attaching a movable member (such as an inner cutting edge of an electric razor) of an electrical beauty appliance is attached to first outer yoke 122.

First inner yoke 123 is a tubular (cylindrical in the drawings) member formed of a magnetic material and is disposed on the inner peripheral surface of first magnet 121 with coil 112 interposed therebetween. First inner yoke 123 is fixed to protruding portion 122a of first outer yoke 122, for example, by adhesion.

First bearings 124 and 124 are fixed to the inner peripheral surface of first inner yoke 123, for example, by adhesion in a state where they are separated a predetermined distance therefrom. First bearings 124 and 124 can slide along spindle 111.

First movable section 120 is attached to fixed section 110 by inserting first inner yoke 123 having first bearings 124 fixed thereto, into one hollow portion (on the right side in the drawings) of bobbin 113 with compression coil spring 141 interposed therebetween. At this time, one end of coil 112 is interposed between first magnet 121 and first inner yoke 123, and spindle 111 is inserted into first bearings 124 and 124.

By attaching spring stopping member 143 to one end of spindle 111 in a state where spindle 111 is inserted into compression coil spring 142 and compression coil springs 141 and 142 are compressed, first movable section 120 is maintained in a state where restoring forces of compression coil springs 141 and 142 are balanced. That is, first movable section 120 is elastically maintained by two compression coil springs 141 and 142.

First magnet 121, first outer yoke 122, first inner yoke 123, and first bearings 124 are unified and reciprocate as first movable section 120.

Second movable section 130 is symmetrically disposed with respect to first movable section 120. That is, second movable section 130 includes second magnet 131, second outer yoke 132, second inner yoke 133, and second bearings 134.

Second magnet 131 is a tubular (cylindrical in the drawings) permanent magnet and is magnetized in the inside-outside direction (in the radial direction). The magnetization direction of second magnet 131 is opposite to the magnetization direction of first magnet 121. That is, the inner peripheral side of second magnet 131 is magnetized to the north pole and the outer peripheral side thereof is magnetized to the south pole. It is preferable that second magnet 131 is an anisotropic magnet providing a magnetic force stronger than that of an isotropic magnet.

Second outer yoke 132 is a tubular (cylindrical in the drawings) member formed of a magnetic material and is disposed on the outer peripheral surface of second magnet 131. Second magnet 131 is fixed to the inner peripheral surface of second outer yoke 132, for example, by adhesion. Protruding portion 132a to which second inner yoke 133 is fixed is formed at one end of second outer yoke 132.

Output connection section 135 for attaching a movable member (such as an inner cutting edge of an electric razor) of an electrical beauty appliance is attached to second outer yoke 132.

Second inner yoke 133 is a tubular (cylindrical in the drawings) member formed of a magnetic material and is disposed on the inner peripheral surface of second magnet 131 with coil 112 interposed therebetween. Second inner yoke 133 is fixed to protruding portion 132a of second outer yoke 132, for example, by adhesion.

Second bearings 134 and 134 are fixed to the inner peripheral surface of second inner yoke 133, for example, by adhesion in a state where they are separated a predetermined distance therefrom. Second bearings 134 and 134 can slide along spindle 111.

Second movable section 130 is attached to fixed section 110 by inserting second inner yoke 133 having second bearings 134 fixed thereto, into the other hollow portion (on the left side in the drawings) of bobbin 113 with compression coil spring 151 interposed therebetween. At this time, the other end of coil 112 is interposed between second magnet 131 and second inner yoke 133, and spindle 111 is inserted into second bearings 134 and 134.

By attaching spring stopping member 153 to the other end of spindle 111 in a state where spindle 111 is inserted into compression coil spring 152 and compression coil springs 151 and 152 are compressed, second movable section 130 is maintained in a state where restoring forces of compression coil springs 151 and 152 are balanced. That is, second movable section 130 is elastically maintained by two compression coil springs 151 and 152.

Second magnet 131, second outer yoke 132, second inner yoke 133, and second bearings 134 are unified and reciprocate as second movable section 130.

Figure 4:
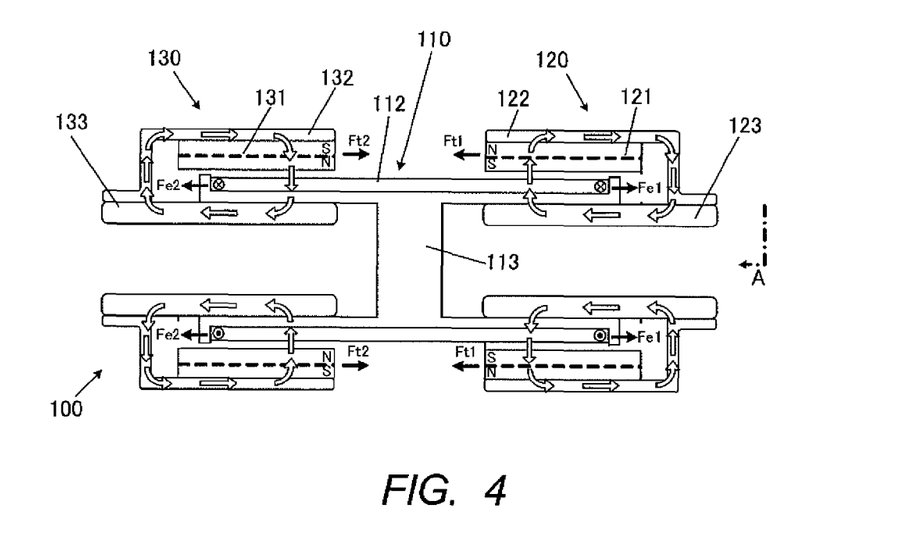
FIG. 4 is a diagram illustrating a thrust generated in a movable section when current flows in a coil.

FIG. 4 is a diagram illustrating thrusts generated in first movable section 120 and second movable section 130 when current flows in coil 112.

As shown in FIG. 4, magnetic lines of force coming out from the north pole of first magnet 121 pass through first outer yoke 122 and first inner yoke 123, traverse coil 112, and are returned to the south pole. That is, a magnetic field vertically traversing the coil from the inside to the outside is generated in a portion of coil 112 corresponding to first magnet 121.

Since first movable section 120 includes first outer yoke 122 disposed on the outer peripheral surface of first magnet 121 and first inner yoke 123 disposed on the inner peripheral surface of first magnet 121 with coil 112 interposed therebetween, it is possible to easily generate a desired magnetic field. By arranging only any one of first outer yoke 122 and first inner yoke 123, it is more effective than a case where first magnet 121 is simply disposed.

Magnetic lines of force coming out from the north pole of second magnet 131 traverse coil 112, pass through second inner yoke 133 and second outer yoke 132, and are returned to the south pole. That is, a magnetic field vertically traversing the coil from the outside to the inside is generated in the portion of coil 112 corresponding to second magnet 131.

Since first movable section 120 includes first outer yoke 122 disposed on the outer peripheral surface of first magnet 121 and first inner yoke 123 disposed on the inner peripheral surface of first magnet 121 with coil 112 interposed therebetween, it is possible to easily generate a desired magnetic field. By arranging only any one of first outer yoke 122 and first inner yoke 123, it is more effective than a case where first magnet 121 is simply disposed. The same is said to be true of second movable section 130.

Here, when current in the clockwise direction in arrow A of FIG. 4 flows in coil 112, electromagnetic force $F_{e1}$ directed to the outside (the right side in FIG. 4) in the axial direction acts on the portion of coil 112 corresponding to first magnet 121 in accordance with the Fleming's left-hand law. However, since coil 112 is fixed, thrust $F_{t1}$ directed to the inside (the left side in FIG. 4) in the axial direction acts on first movable section 120 in accordance with the law of action and reaction.

Figure 5:
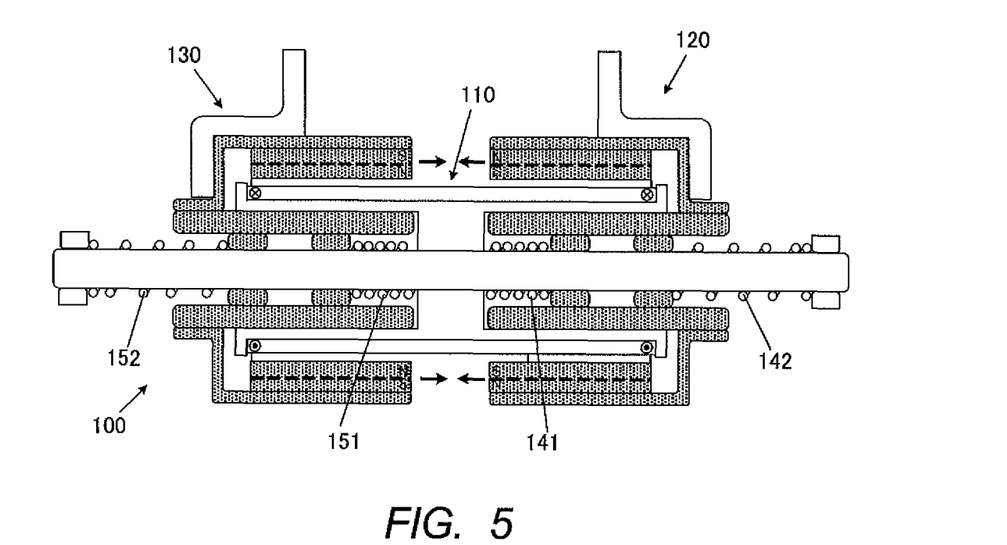
FIG. 5 is a diagram illustrating reciprocation of the movable section of the actuator according to Embodiment 1.

Due to this thrust $F_{t1}$, first movable section 120 moves to the inside in the axial direction while compressing compression coil spring 141 (see FIG. 5).

Similarly, electromagnetic force $F_{e2}$ directed to the outside (the left side in FIG. 4) in the axial direction acts on the portion of coil 112 corresponding to second magnet 131. However, since coil 112 is fixed, thrust $F_{t2}$ directed to the inside (the right side in FIG. 4) in the axial direction acts on second movable section 130 in accordance with the law of action and reaction.

Due to this thrust $F_{t2}$, second movable section 130 moves to the inside (the side opposite to that in first movable section 120) in the axial direction while compressing compression coil spring 151 (see FIG. 5).

Figure 6:
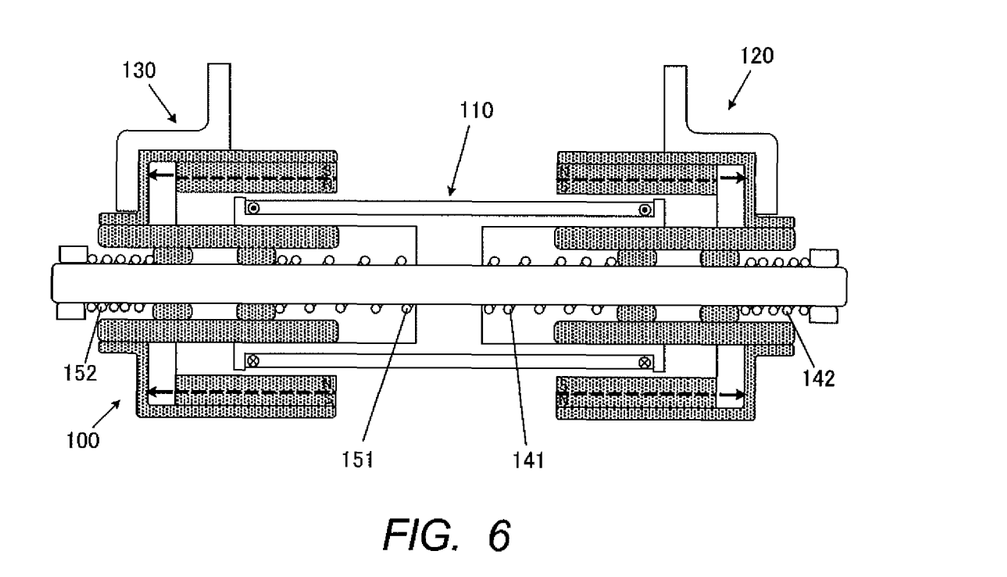
FIG. 6 is a diagram illustrating reciprocation of the movable section of the actuator according to Embodiment 1.

When current in the counterclockwise direction in arrow A of FIG. 4 flows in coil 112, first movable section 120 moves to the outside in the axial direction while compressing compression coil spring 142, and second movable section 130 moves to the outside (the side opposite to that in first movable section 120) in the axial direction while compressing compression coil spring 152 (see FIG. 6).

Therefore, when AC current flows in coil 112, first movable section 120 and second movable section 130 reciprocate in the opposite directions.

A motion equation representing the principle of operation of actuator 100 is expressed by equation 1 and a circuit equation thereof is expressed by equation 2. That is, first movable section 120 and second movable section 130 reciprocate on the basis of equations 1 and 2.

(Equation 1)
$$m\frac{d^2 x(t)}{dt^2} = K_f i(t) - K_{sp} x(t) - D\frac{dx(t)}{dt} - T_{loss} \quad [1]$$

Here, m represents a mass [kg], x(t) represents a displacement [m], $K_f$ represents a thrust constant [N/A], i(t) represents a current [A], $K_{sp}$ represents a spring constant [N/m], D represents an attenuation coefficient [N/(m/s)], and $T_{loss}$ represents a load [N].

(Equation 2)
$$e(t) = Ri(t) + L\frac{di(t)}{dt} + K_e \frac{dx(t)}{dt} \quad [2]$$

Here, e(t) represents a voltage [V], R represents a resistance [Ω], L represents an inductance [H], and $K_e$ represents a counter electromotive force constant [V/(m/s)].

The resonance frequency of actuator 100 is determined by the masses of first movable section 120 and second movable section 130 and the spring constants of compression coil springs 141, 142, 151, and 152, as expressed by equation 3. By driving actuator 100 with AC current of substantially the same frequency as resonance frequency $f_r$, it is possible to efficiently obtain a large output. That is, since the actuator can be driven with low power consumption in a steady state, the energy efficiency of actuator 100 is improved.

(Equation 3)
$$f_r = \frac{1}{2\pi}\sqrt{\frac{K_{sp}}{m}} \quad [3]$$

Here, $f_r$ represents the resonance frequency [Hz].

In this way, actuator 100 according to Embodiment 1 includes fixed section 110 that has spindle 111 and coil 112 fixed to spindle 111 with bobbin 113 interposed therebetween, first movable section 120 that has first magnet 121 magnetized in the radial direction and disposed to cover the outer peripheral surface of one end in the axial direction of fixed section 110, that is mounted on spindle 111 in an elastically-maintained state, and that is movable in the axial direction, and second movable section 130 that has second magnet 131 magnetized in the radial direction and disposed to cover the outer peripheral surface of the other end in the axial direction of fixed section 110, that is mounted on spindle 111 in an elastically-maintained state, and that is movable in the axial direction.

When current flows in coil 112, first movable section 120 and second movable section 130 move in the opposite directions.

Specifically, first magnet 121 and second magnet 131 generate magnetic fields vertically traversing current flowing in coil 112, and thus thrust $F_{t1}$ generated in first movable section 120 in accordance with the Fleming's left-hand law and thrust $F_{t2}$ generated in second movable section 130 have the opposite directions when current flows in coil 112.

According to actuator 100, since first movable section 120 and second movable section 130 reciprocate in the opposite directions to cancel vibration, it is possible to effectively prevent vibration from being transmitted to a user. Since the centers of gravity of first movable section 120 and second movable section 130 can be designed to be coaxial with each other by using the spindle mechanism, vibration directions thereof are not offset and thus the vibration is effectively suppressed.

Since it is not necessary to provide a dynamic vibration absorber or a power transducer mechanism, it is possible to achieve space saving and downsizing and thus to improve the degree of freedom in design or the designability of a product on which the actuator will be mounted.

Therefore, by employing actuator 100, it is possible to provide an electrical beauty appliance which has excellent designability and which is good for a user to use with low vibration and low noise.

In actuator 100, coil 112 is wound in the same direction over the entire length of fixed section 110, and the magnetization direction of first magnet 121 and the magnetization direction of second magnet 131 are opposite to each other.

Accordingly, it is possible to cause first movable section 120 and second movable section 130 to reciprocate in the opposite directions with a simple structure. It is also possible to simply assemble actuator 100.

(Embodiment 2)

Figure 7:
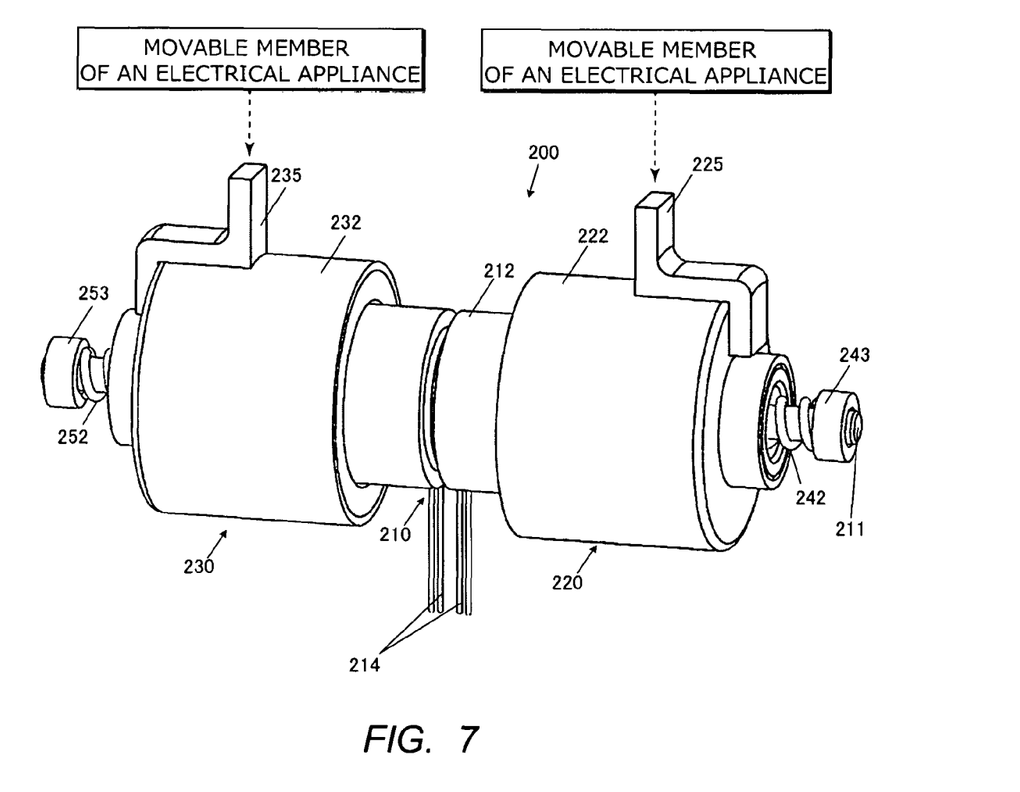
FIG. 7 is an exterior perspective view of an actuator according to Embodiment 2 of the claimed invention.
Figure 8:
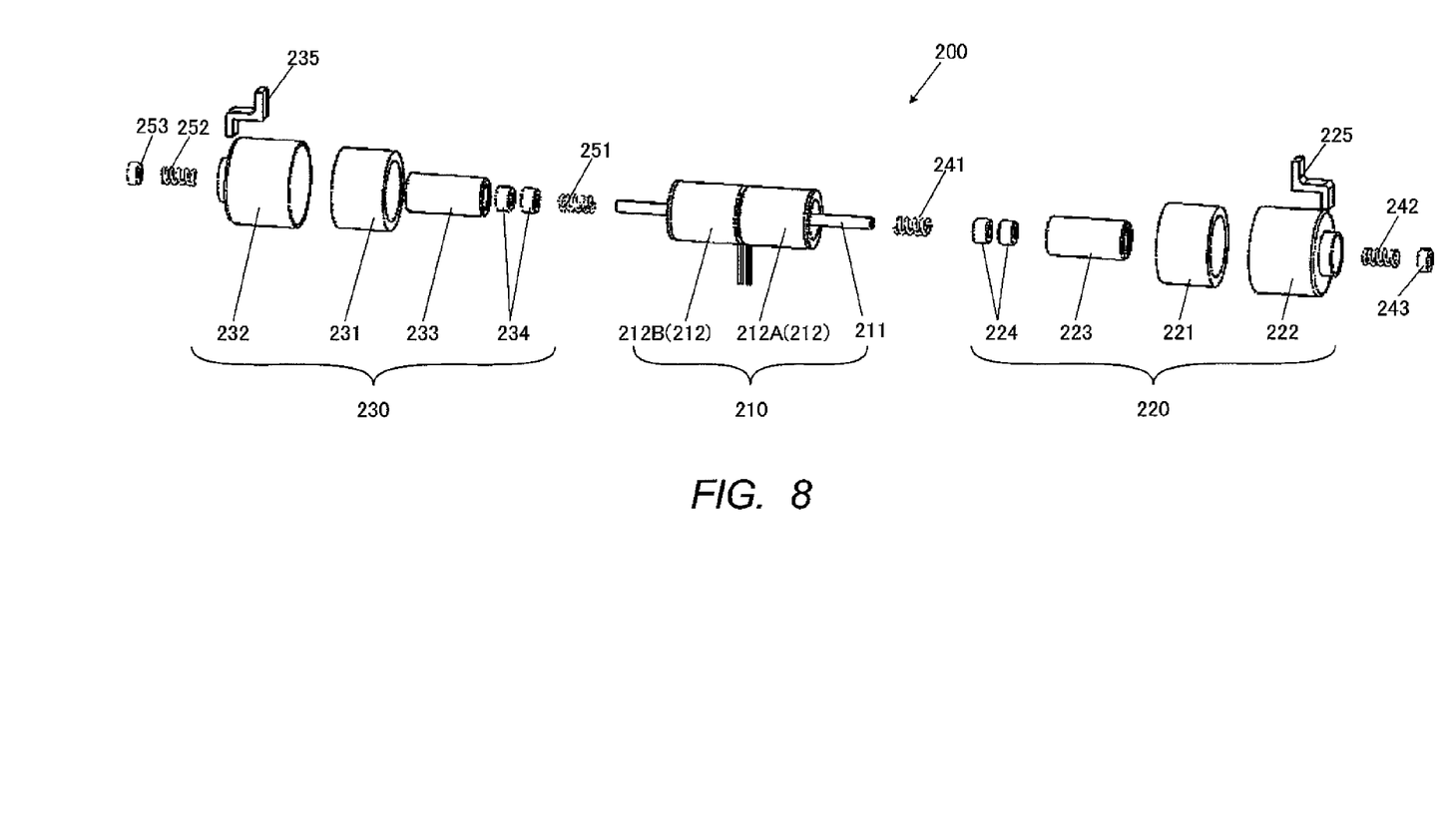
FIG. 8 is an exploded perspective view of the actuator according to Embodiment 2.
Figure 9:
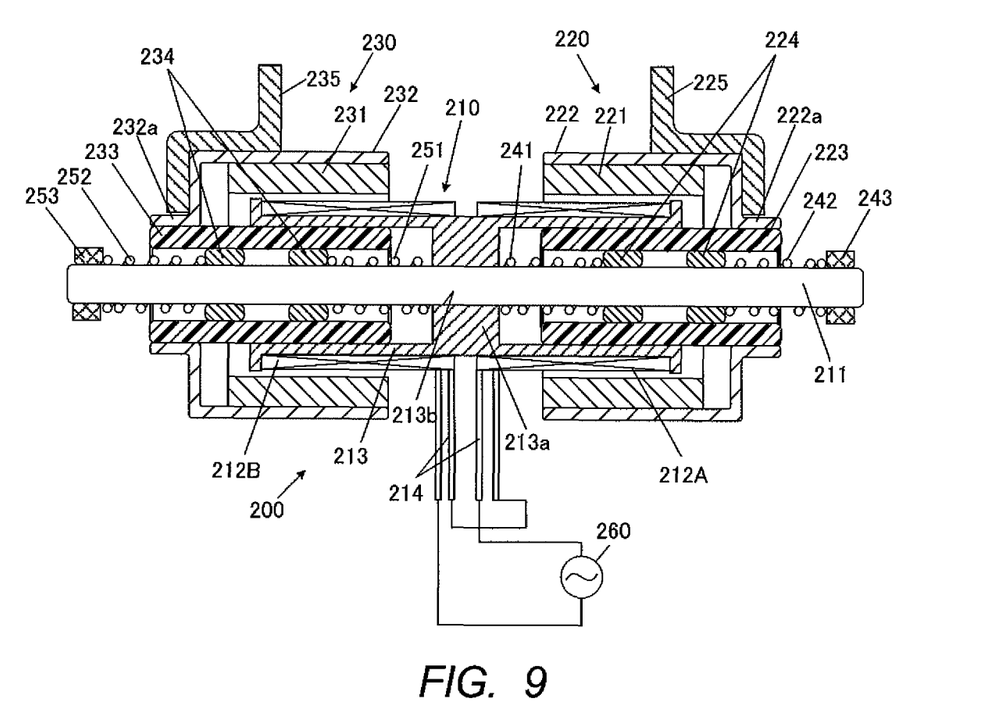
FIG. 9 is a longitudinal cross-sectional view taken along an axial direction of the actuator according to Embodiment 2.

FIG. 7 is an exterior perspective view of actuator 200 according to Embodiment 2. FIG. 8 is an exploded perspective view of actuator 200. FIG. 9 is a longitudinal cross-sectional view taken along an axial direction of actuator 200. Actuator 200 is applied to an electrical beauty appliance such as an electric razor.

Elements equal or corresponding to those of actuator 100 according to Embodiment 1 will be referenced by reference numerals of 200s and description thereof will not be repeated.

As shown in FIGS. 7 to 9, actuator 200 includes fixed section 210, first movable section 220, and second movable section 230. First movable section 220 and second movable section 230 are arranged coaxially with fixed section 210 and reciprocate in the axial direction.

Fixed section 210 includes spindle 211, coil 212, and bobbin 213.

First coil 212A and second coil 212B in which Current flows in the opposite directions are wound on bobbin 213 from the center to both ends in the axial direction. Lead portions 214 drawn out from first coil 212A and second coil 212B are connected to AC power source 260.

In FIG. 9, first coil 212A and second coil 212B are connected in series to AC power source 260, but first coil 212A and second coil 212B may be connected in parallel thereto.

First movable section 220 includes first magnet 221, first outer yoke 222, first inner yoke 223, and first bearings 224.

First magnet 221 is a ring-like permanent magnet and is magnetized in a radial direction (radially from the center). Here, it is assumed that the inner peripheral side of first magnet 221 is magnetized to the north pole and the outer peripheral side thereof is magnetized to the south pole.

Second movable section 230 is symmetrically disposed with respect to first movable section 220. That is, second movable section 230 includes second magnet 231, second outer yoke 232, second inner yoke 233, and second bearings 234.

Second magnet 231 is a ring-like permanent magnet and is magnetized in a radial direction (radially from the center). The magnetization direction of second magnet 231 is the same as the magnetization direction of first magnet 221. That is, the inner peripheral side of second magnet 231 is magnetized to the north pole and the outer peripheral side thereof is magnetized to the south pole.

Figure 10:
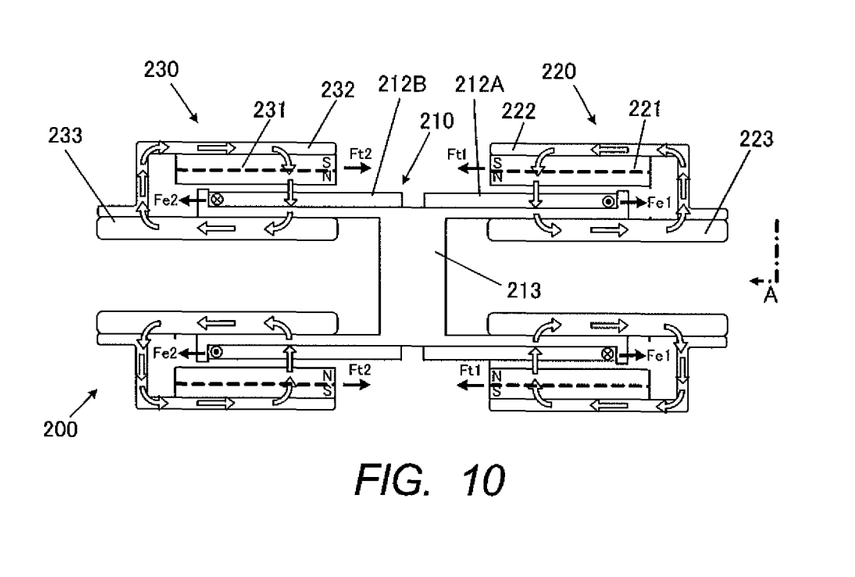
FIG. 10 is a diagram illustrating a thrust generated in a movable section when current flows in a coil.

FIG. 10 is a diagram illustrating thrusts generated in first movable section 220 and second movable section 230 when current flows in first coil 212A and second coil 212B.

As shown in FIG. 10, magnetic lines of force coming out from the north pole of first magnet 221 traverse first coil 212A, pass through first inner yoke 223 and first outer yoke 222, and is returned to the south pole. That is, a magnetic field vertically traversing first coil 212A from the outside to the inside is generated in first coil 212A.

Similarly, magnetic lines of force coming out from the north pole of second magnet 231 traverse second coil 212B, pass through second inner yoke 233 and second outer yoke 232, and is returned to the south pole. That is, a magnetic field vertically traversing second coil 212B from the outside to the inside is generated in second coil 212B.

Here, when current in the counterclockwise direction in arrow A in FIG. 10 flows in first coil 212A, electromagnetic force $F_{e1}$ directed to the outside (the right side in FIG. 10) in the axial direction acts on first coil 212A in accordance with the Fleming's left-hand law. However, since first coil 212A is fixed, thrust $F_{t1}$ directed to the inside (the left side in FIG. 10) in the axial direction acts on first movable section 220 in accordance with the law of action and reaction. Due to this thrust $F_{t1}$, first movable section 220 moves to the inside in the axial direction while compressing compression coil spring 241.

At this time, current in the opposite direction to that in first coil 212A, that is, in the clockwise direction in arrow A of FIG. 10, flows in second coil 212B. Therefore, electromagnetic force $F_{e2}$ directed to the outside (the left side in FIG. 10) in the axial direction acts on second coil 212B in accordance with the Fleming's left-hand law. However, since second coil 212B is fixed, thrust $F_{t2}$ directed to the inside (the right side in FIG. 10) in the axial direction acts on second movable section 230 in accordance with the law of action and reaction. Due to this thrust $F_{t2}$, second movable section 230 moves to the inside (the side opposite to that in first movable section 220) in the axial direction while compressing compression coil spring 251.

When current in the clockwise direction in arrow A of FIG. 10 flows in first coil 212A and current in the counterclockwise direction flows in second coil 212B, first movable section 220 moves to the outside in the axial direction while compressing compression coil spring 242, and second movable section 230 moves to the outside (the side opposite to that in first movable section 220) in the axial direction while compressing compression coil spring 252.

Therefore, when AC current flows in first coil 212A and second coil 212B, first movable section 220 and second movable section 230 reciprocate in the opposite directions.

In this way, actuator 200 according to Embodiment 2 includes fixed section 210 that has spindle 211 and coil 212 (first coil 212A and second coil 212B) fixed to spindle 211 with bobbin 213 interposed therebetween, first movable section 220 that has first magnet 221 magnetized in the radial direction and disposed to cover the outer peripheral surface of one end in the axial direction of fixed section 210, that is mounted on spindle 211 in an elastically-maintained state, and that is movable in the axial direction, and second movable section 230 that has second magnet 231 magnetized in the radial direction and disposed to cover the outer peripheral surface of the other end in the axial direction of fixed section 210, that is mounted on spindle 211 in an elastically-maintained state, and that is movable in the axial direction.

When current flows in coil 212, first movable section 220 and second movable section 230 move in the opposite directions.

Specifically, first magnet 221 and second magnet 231 generate magnetic fields vertically traversing current flowing in coil 212, and thus thrust $F_{f1}$ generated in first movable section 220 in accordance with the Fleming's left-hand law and thrust $F_{f2}$ generated in second movable section 230 have the opposite directions when current flows in coil 212.

According to actuator 200, since first movable section 220 and second movable section 230 reciprocate in the opposite directions to cancel vibration, it is possible to effectively prevent vibration from being transmitted to a user. Since the centers of gravity of first movable section 220 and second movable section 230 can be designed to be coaxial with each other by using the spindle mechanism, vibration directions thereof are not offset and thus the vibration is effectively suppressed.

Since it is not necessary to provide a dynamic vibration absorber or a power transducer mechanism, it is possible to achieve space saving and downsizing and thus to improve the degree of freedom in design or the designability of a product on which the actuator will be mounted.

Therefore, by employing actuator 200, it is possible to provide an electrical beauty appliance which has excellent designability and which is good for a user to use with low vibration and low noise.

In actuator 200, coil 212 includes first coil 212A which is wound to correspond to first magnet 221 and in which current flows in a first direction and second coil 212B which is wound to correspond to second magnet 231 and in which current flows in a second direction which is opposite to the first direction. The magnetization direction of first magnet 221 is the same as that of second magnet 231.

Accordingly, it is possible to cause first movable section 220 and second movable section 230 to reciprocate in the opposite directions with a simple structure. It is also possible to simply assemble actuator 200.

Since first movable section 220 and second movable section 230 have the same structure and can be manufactured through the same manufacturing process, it is possible to reduce manufacturing cost thereof. When first coil 212A and second coil 212B are connected in parallel, coil resistance is reduced and it is thus possible to reduce copper loss during operation.

(Embodiment 3)

Figure 11:
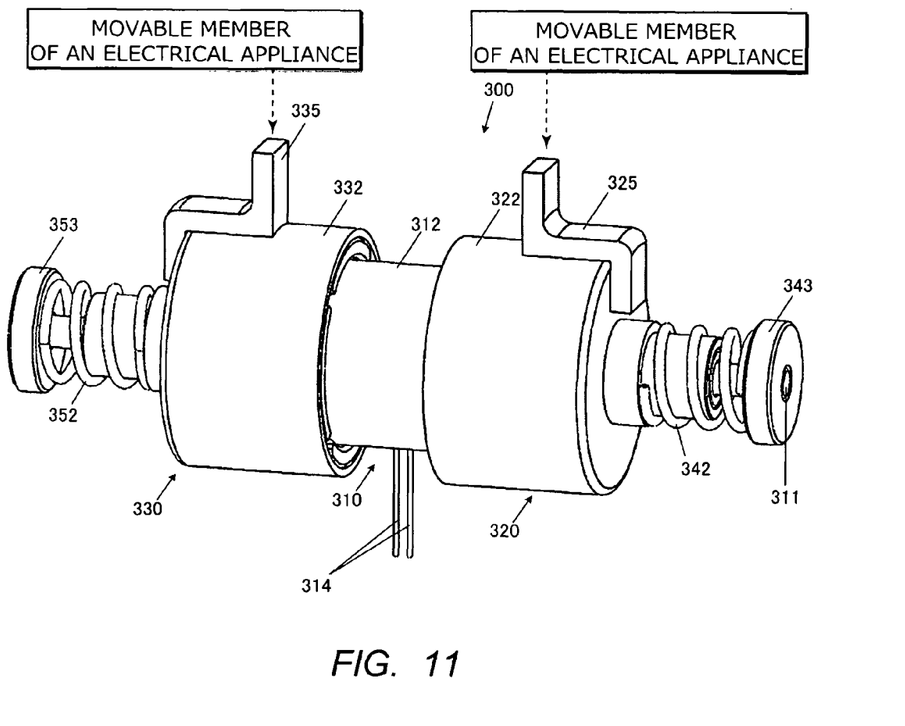
FIG. 11 is an exterior perspective view of an actuator according to Embodiment 3 of the claimed invention.
Figure 12:
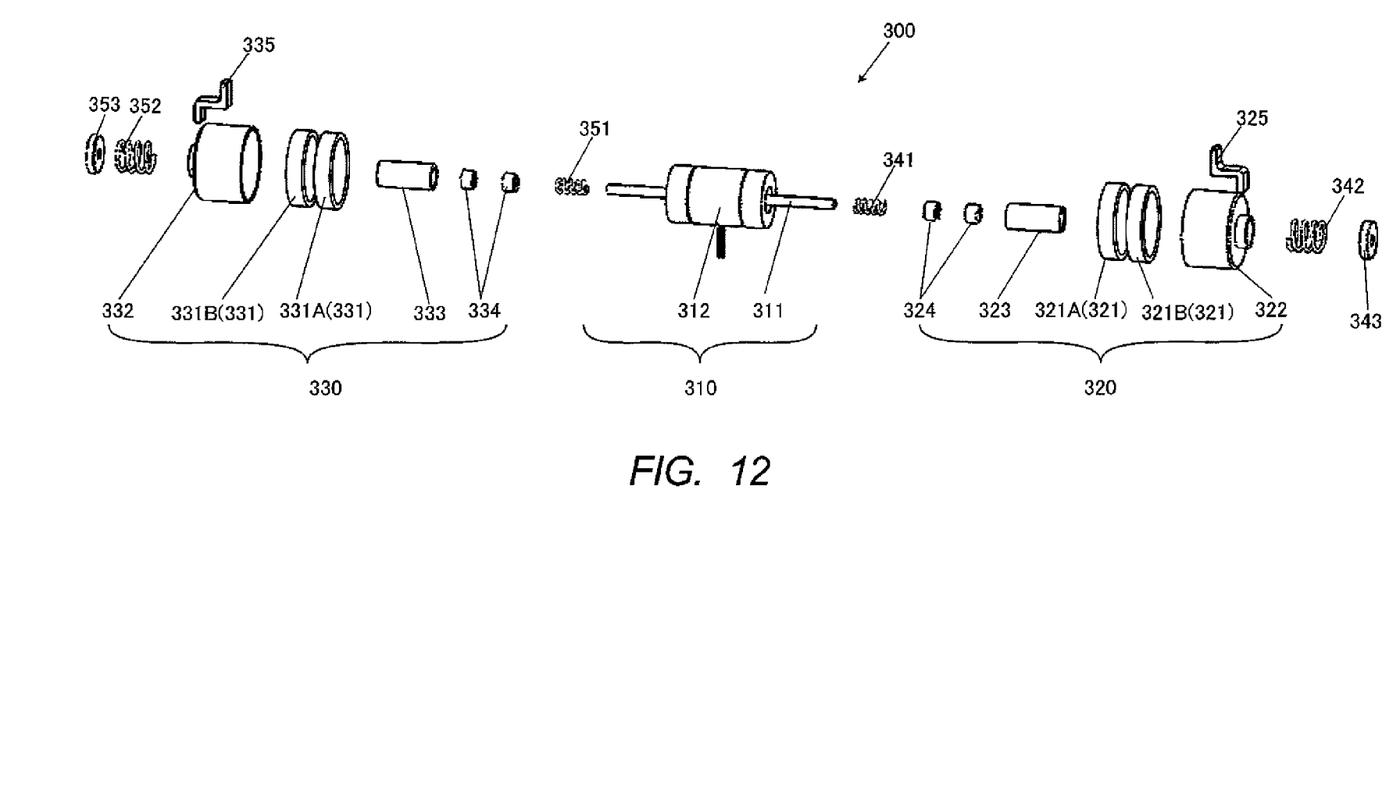
FIG. 12 is an exploded perspective view of the actuator according to Embodiment 3.
Figure 13:
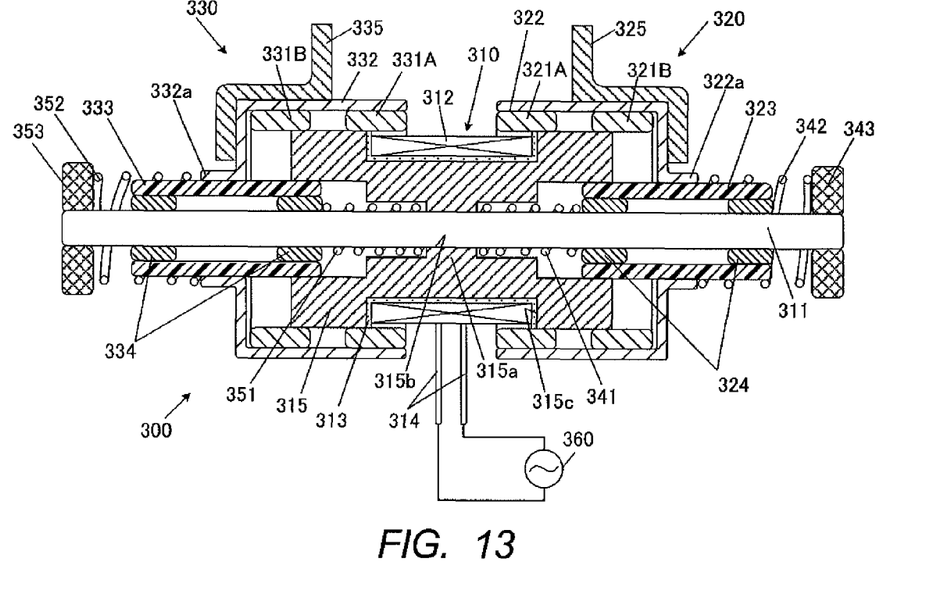
FIG. 13 is a longitudinal cross-sectional view taken along an axial direction of the actuator according to Embodiment 3.

FIG. 11 is an exterior perspective view of actuator 300 according to Embodiment 3. FIG. 12 is an exploded perspective view of actuator 300. FIG. 13 is a longitudinal cross-sectional view taken along an axial direction of actuator 300. Actuator 300 is applied to an electrical beauty appliance such as an electric razor.

Elements equal or corresponding to those of actuator 100 according to Embodiment 1 will be referenced by reference numerals of 300s and description thereof will not be repeated.

As shown in FIGS. 11 to 13, actuator 300 includes fixed section 310, first movable section 320, and second movable section 330. First movable section 320 and second movable section 330 are arranged coaxially with fixed section 310 and reciprocate in the axial direction.

Fixed section 310 includes spindle 311, coil 312, bobbin 313, and core 315.

Core 315 is a tubular (cylindrical in the drawings) member formed of a magnetic material, and partition wall 315a is formed at the center in the axial direction of the hollow portion thereof. Penetration hole 315b is formed in partition wall 315a, and spindle 311 is inserted through penetration hole 315b and is fixed. Concave portion 315c is formed at the center in the axial direction of the outer peripheral surface of core 315, and coil 312 is wound on concave portion 315c with insulating bobbin 313 interposed therebetween. AC power source 360 is connected to lead portions 314 drawn out from coil 312. Fixed section 310 is an electromagnet in which core 315 is magnetized only when current flows in coil 312.

First movable section 320 includes first magnet 321, first outer yoke 322, first inner yoke 323, and first bearings 324.

First magnet 321 is disposed to generate an attractive force or a repulsive force with respect to fixed section 310, and includes two magnets 321A and 321B which are magnetized in the opposite directions. The number of elements of first magnet 321 is not particularly limited, as long as the magnetization directions of neighboring magnets are opposite to each other.

First magnets 321A and 321B are tubular (cylindrical in the drawings) permanent magnets and magnetized in the inside-outside direction (in the radial direction). Herein, it is assumed that the inner peripheral side of first magnet 321A disposed on the inner side is magnetized to the north pole and the outer peripheral side thereof is magnetized to the south pole, and it is assumed that the inner peripheral side of first magnet 321B disposed on the outer side is magnetized to the south pole and the outer peripheral side thereof is magnetized to the north pole.

Second movable section 330 is symmetrically disposed with respect to first movable section 320. That is, second movable section 330 includes second magnet 331, second outer yoke 332, second inner yoke 333, and second bearings 334.

Second magnet 331 is disposed to generate an attractive force or a repulsive force with respect to fixed section 310, and includes two magnets 331A and 331B which are magnetized in the opposite directions herein. The number of elements of second magnet 331 is not particularly limited, as long as the magnetization directions of neighboring magnets are opposite to each other.

Second magnets 331A and 331B are tubular (cylindrical in the drawings) permanent magnets and magnetized in the inside-outside direction (in the radial direction). The magnetization direction of second magnets 331 is opposite to the magnetization direction of first magnet 221. That is, the inner peripheral side of second magnet 331A disposed on the inner side is magnetized to the south pole and the outer peripheral side thereof is magnetized to the north pole. The inner peripheral side of second magnet 331B disposed on the outer side is magnetized to the north pole and the outer peripheral side thereof is magnetized to the south pole.

Figure 14:
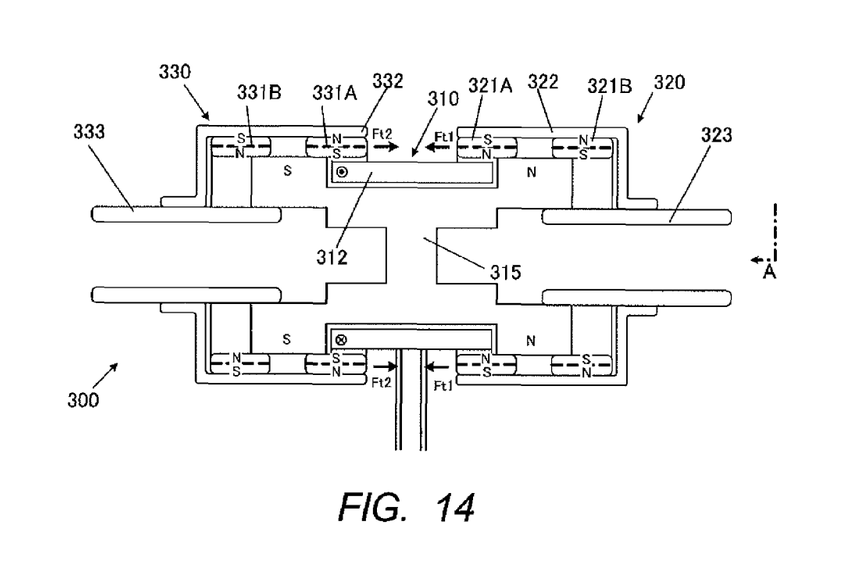
FIG. 14 is a diagram illustrating an attractive force or a repulsive force generated in a movable section when current flows in a coil.

FIG. 14 is a diagram illustrating thrusts generated in first movable section 320 and second movable section 330 when current flows in coil 312.

As shown in FIG. 14, when current in the counterclockwise direction in arrow A flows in coil 312, the portion of core 315 corresponding to first magnet 321 is magnetized to the north pole. A repulsive force is generated between first magnet 321A disposed on the inner side and core 315, and an attractive force is generated between first magnet 321B disposed on the outer side and core 315. Therefore, first movable section 320 moves to the inside in the axial direction while compressing compression coil spring 341.

On the other hand, the portion of core 315 corresponding to second magnet 331 is magnetized to the south pole. A repulsive force is generated between second magnet 331A disposed on the inner side and core 315 and an attractive force is generated between second magnet 331B disposed on the outer side and core 315. Therefore, second movable section 330 moves to the inside in the axial direction while compressing compression coil spring 351.

When current in the counterclockwise direction in arrow A of FIG. 14 flows in coil 312, core 315 is magnetized in the opposite directions. Accordingly, first movable section 320 moves to the outside in the axial direction while compressing compression coil spring 342, and second movable section 330 moves to the outside (the side opposite to that in first movable section 320) in the axial direction while compressing compression coil spring 352.

Therefore, when AC current flows in coil 312, first movable section 320 and second movable section 330 reciprocate in the opposite directions.

In this way, actuator 300 according to Embodiment 3 includes fixed section 310 that has spindle 311 and coil 312 fixed to spindle 311 with core 315 and bobbin 313 interposed therebetween, first movable section 320 that has first magnet 321 magnetized in the radial direction and disposed to cover the outer peripheral surface of one end in the axial direction of fixed section 310, that is mounted on spindle 311 in an elastically-maintained state, and that is movable in the axial direction, and second movable section 330 that has second magnet 331 magnetized in the radial direction and disposed to cover the outer peripheral surface of the other end in the axial direction of fixed section 310, that is mounted on spindle 311 in an elastically-maintained state, and that is movable in the axial direction.

When current flows in coil 312, first movable section 320 and second movable section 330 move in the opposite directions.

Specifically, fixed section 310 is an electromagnet in which coil 312 is wound on the outer peripheral surface of core 315 formed of a magnetic material, and the magnetization direction of first magnet 321 and the magnetization direction of second magnet 331 are opposite to each other. When current flows in coil 312 and both ends of core 315 are magnetized to the opposite poles, an attractive force or a repulsive force acting between first magnet 321 and core 315 and an attractive force or a repulsive force acting between second magnet 331 and core 315 have the opposite directions.

According to actuator 300, since first movable section 320 and second movable section 330 reciprocate in the opposite directions to cancel vibration, it is possible to effectively prevent vibration from being transmitted to a user. Since the centers of gravity of first movable section 320 and second movable section 330 can be designed to be coaxial with each other by using the spindle mechanism, vibration directions thereof are not offset and thus the vibration is effectively suppressed.

Since it is not necessary to provide a dynamic vibration absorber or a power transducer mechanism, it is possible to achieve space saving and downsizing and thus to improve the degree of freedom in design or the designability of a product on which the actuator will be mounted.

Therefore, by employing actuator 300, it is possible to provide an electrical beauty appliance which has excellent designability and which is good for a user to use with low vibration and low noise.

The claimed invention made by the inventor has hitherto been described in detail with reference to the embodiments, but the claimed invention is not limited to the embodiments and can be modified in various forms without departing from the concept thereof.

Figure 15:
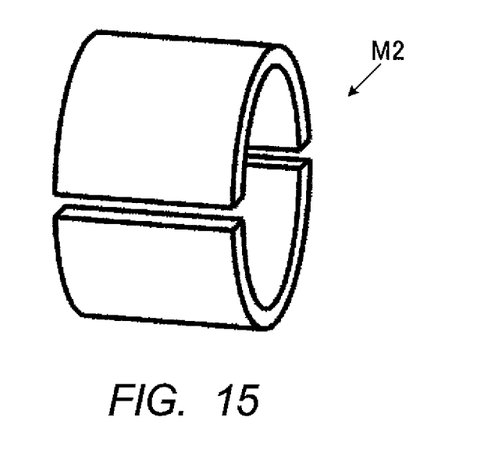
FIG. 15 is a diagram illustrating an example of a magnet that is used in the actuators according to the embodiments.
Figure 16:
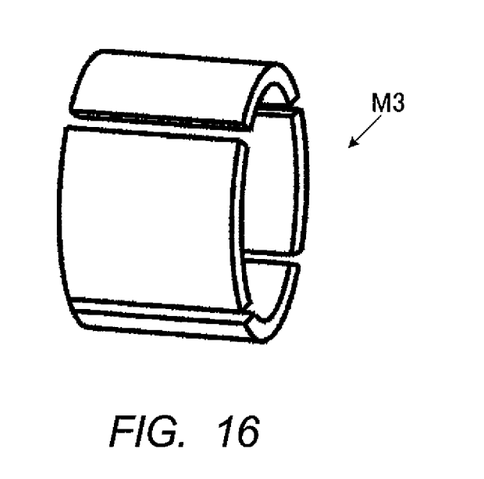
FIG. 16 is a diagram illustrating another example of the magnet that is used in the actuators according to the embodiments.

For example, instead of first magnet 121 and second magnet 131 in Embodiment 1, multi-segment type magnets such as two-segment magnet M2 shown in FIG. 15 or four-segment magnet M3 shown in FIG. 16 may be applied. The same is true of Embodiment 2 and Embodiment 3.

Since they can be easily oriented anisotropically and can be easily magnetized in the inside-outside direction (in the radial direction), multi-segment type magnets M2 and M3 can be stably manufactured and can be available at low cost. Therefore, by employing multi-segment type magnets M2 and M3, it is possible to reduce manufacturing cost of actuator 100.

Instead of first magnet 121 and second magnet 131 in Embodiment 1, a magnet in which plural square magnets are combined to form a square tube shape as a whole may be applied. In this case, the square magnets are magnetized in the thickness direction (in the inside-outside direction).

For example, instead of compression coil springs 141, 142, 151, and 152 in Embodiment 1, an elastic member such as a leaf spring or a magnetic spring may be applied. The same is true of Embodiment 2 and Embodiment 3.

The embodiments disclosed herein are all exemplary and should not be considered to be restrictive. The scope of the claimed invention is defined by the appended claims, not the above description, and is intended to include all modifications equivalent to the appended claims or belonging to the scope thereof.

What is claimed is:

1. An actuator comprising:
    a fixed section that includes a spindle, a coil fixed to the spindle, a partition wall disposed at a center of the spindle, a first spring stopping member disposed at one end of the spindle, and a second spring stopping member disposed at another end of the spindle;
    a first movable section that includes:
        a first magnet magnetized in an inside-outside direction and disposed to cover the outer peripheral surface of one end in an axial direction of the fixed section;
        a first output connection portion to which a movable member of an electrical appliance is attached,
        the first movable section being mounted on the spindle in an elastically-maintained state between the partition wall and the first spring stopping member by a first compression coil spring inserted over the spindle between the partition wall and the first movable section and by another first compression coil spring inserted over the spindle between the first spring stopping member and the first movable section, and the first movable section being movable in the axial direction; and a second movable section that includes:
   a second magnet magnetized in the inside-outside direction and disposed to cover the outer peripheral surface of the other end in the axial direction of the fixed section;
   a second output connection portion to which a movable member of an electrical appliance is attached,
   the second movable section being mounted on the spindle in an elastically-maintained state between the partition wall and the second spring stopping member by a second compression coil spring inserted over the spindle between the partition wall and the second movable section and by another second compression coil spring inserted over the spindle between the second spring stopping member and the second movable section, and the second movable section being movable in the axial direction, wherein:
   the first movable section and the second movable section are arranged symmetrically in the axial direction with respect to the partition wall,
   the first output connection portion and the second output connection portion each have an attachment portion projecting in a direction orthogonal to a movement direction of the first movable section and the second movable section, and
   when current flows in the coil, the first movable section and the second movable section move in opposite directions.

2. The actuator according to claim 1, wherein the first magnet and the second magnet generate magnetic fields vertically traversing current flowing in the coil, and
   wherein when current flows in the coil, a thrust generated in the first movable section in accordance with Fleming's left-hand law and a thrust generated in the second movable section have opposite directions.

3. The actuator according to claim 2, wherein the first movable section includes a first outer yoke disposed on the outer peripheral surface of the first magnet or a first inner yoke disposed on the inner peripheral surface of the first magnet with the coil interposed therebetween, and
   wherein the second movable section includes a second outer yoke disposed on the outer peripheral surface of the second magnet or a second inner yoke disposed on the inner peripheral surface of the second magnet with the coil interposed therebetween.

4. The actuator according to claim 2, wherein the coil is wound in the same direction over the entire length of the fixed section, and
   wherein the magnetization direction of the first magnet and the magnetization direction of the second magnet are opposite to each other.

5. The actuator according to claim 2, wherein the coil includes a first coil which is wound to correspond to the first magnet and in which current flows in a first direction, and a second coil which is wound to correspond to the second magnet and in which current flows in a second direction opposite to the first direction, and
   wherein the magnetization direction of the first magnet and the magnetization direction of the second magnet are the same.

6. The actuator according to claim 1, wherein the fixed section is an electromagnet in which the coil is wound on the outer peripheral surface of a core formed of a magnetic material,
   wherein the magnetization direction of the first magnet and the magnetization direction of the second magnet are opposite to each other, and
   wherein when current flows in the coil and both ends of the core are magnetized to opposite polarities, an attractive force or a repulsive force acting between the first magnet and the core and an attractive force or a repulsive force acting between the second magnet and the core have opposite direction to each other.

7. The actuator according to claim 1, wherein the first magnet and the second magnet are constructed by combining a plurality of segment type magnets.

8. The actuator according to claim 1, wherein the first magnet and the second magnet are anisotropic magnets.

9. The actuator according to claim 1, wherein the coil is driven substantially at a resonance frequency.

10. An electrical beauty appliance comprising the actuator according to claim 1.

* * * * *